US012569873B2

(12) United States Patent
Wiehe et al.

(10) Patent No.: US 12,569,873 B2
(45) Date of Patent: Mar. 10, 2026

(54) METHOD AND DEVICE FOR APPLYING PORTIONS OF ADHESIVE

(71) Applicant: Focke & Co. (GmbH & Co. KG), Verden (DE)

(72) Inventors: Martin Wiehe, Buxtehude (DE); Alex Erfurt, Hamburg (DE); Rene Knupper, Pinneberg (DE); Stefan Harms, Hamburg (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 0 days.

(21) Appl. No.: 18/434,989

(22) Filed: Feb. 7, 2024

(65) Prior Publication Data

US 2024/0269705 A1 Aug. 15, 2024

(30) Foreign Application Priority Data

Feb. 9, 2023 (DE) ......................... 102023103184.8

(51) Int. Cl.
*B05C 5/02* (2006.01)

(52) U.S. Cl.
CPC ............ *B05C 5/025* (2013.01); *B05C 5/0225* (2013.01)

(58) Field of Classification Search
CPC . B05C 5/025; B05C 11/1034; B05C 11/1028; B05C 5/0275; B05C 5/0225; F16K 31/0675
See application file for complete search history.

(56) References Cited

U.S. PATENT DOCUMENTS

| | | | |
|---|---|---|---|
| 6,305,583 | B1 | 10/2001 | Ward |
| 9,375,747 | B2 | 6/2016 | Neuhaus |
| 2002/0050579 | A1 | 5/2002 | Near |

FOREIGN PATENT DOCUMENTS

| | | | |
|---|---|---|---|
| DE | 102016011771 A1 * | 4/2018 | ......... B05C 11/1026 |

* cited by examiner

*Primary Examiner* — Alex A Rolland
(74) *Attorney, Agent, or Firm* — Laurence P. Colton; Smith Tempel Blaha LLC

(57) ABSTRACT

A method for applying individual portions of adhesive to a substrate, in which the portions of adhesive are applied successively by means of a valve, a coil of an electromagnet being energized with an actuation voltage pulse for each successive dispensing of portions of adhesive from the valve, which causes a valve opening of the valve for an actual opening duration during which adhesive can flow out of the valve for dispensing the respective adhesive portion by moving a closure member of the valve from a closed position into an open position. The actual opening duration of at least one valve opening which follows a valve opening which precedes it in time is shortened in accordance with one or more valve operating parameters to compensate for electromagnetic interference effects which extend the actual opening duration of the subsequent valve opening.

19 Claims, 2 Drawing Sheets

METHOD AND DEVICE FOR APPLYING PORTIONS OF ADHESIVE

CROSS REFERENCE TO RELATED APPLICATIONS

This patent application claims priority on and the benefit of German Patent Application No. 10 2023 103 184.8 having a filing date of 9 Feb. 2023.

BACKGROUND OF THE INVENTION

Technical Field

The present invention relates to a method and a device for applying individual portions of adhesive to a substrate, in which the portions of adhesive are applied successively (and individually) to the substrate by means of a valve, a coil of an electromagnet being energized with an actuation voltage pulse for each successive dispensing of portions of adhesive from the valve, which causes a valve opening of the valve for an actual opening duration during which adhesive can flow out of the valve for dispensing the respective adhesive portion, in particular by moving a closure member of the valve from a closed position into an open position.

Prior Art

During the manufacturing process for cigarette packs, it is necessary to apply adhesive to various surfaces of the pack blank so that these surfaces can then be glued together. Fast-acting electromagnetically switched valves are used for this purpose, which are used for various adhesive applications in which the valves dispense several punctiform portions of adhesive in quick succession, for example. These valves are subject to different interference effects, so that, even with identical actuation voltage pulses, the actual quantity of adhesive dispensed deviates from the target quantity during operation. In particular, remagnetization effects in the electromagnet as well as self-heating of the valve coil and the associated reduction in adhesive viscosity can lead to an increase in the adhesive portion quantities during operation or, correspondingly, to adhesive dots of different sizes. The remagnetization effects mean that, for example, a closing element of the valve moved by the electromagnet opens earlier than would be the case without remagnetization effects, extending the actual opening time. In the same way, a decreasing viscosity of the adhesive due to the heating of the adhesive during operation of the valve means that the moving closing element can be moved into the open position faster by the adhesive with continued operation than at the beginning of operation with greater viscosity, which also results in an extension of the actual opening time of the respective valve opening.

In order to counteract the aforementioned viscosity-related changes in the actual opening times and thus the change in size or quantity of the adhesive portions, it is known in the prior art, among other things, to detect the adhesive temperature influencing the viscosity of the adhesive and to adjust the opening times of the valve depending on this. The opening times are controlled depending on stored curves that represent the relationship between temperature and viscosity. In the case of successively applied adhesive portions of a group of adhesive portions, in order to obtain identical portion quantities, all portion quantities are aligned with the desired quantity of the last adhesive portion of the group (the largest quantity without such control due to decreasing viscosity). For this purpose, it is usually necessary to make certain predictions about the prevailing viscosity of the adhesive at the time of application of the last adhesive portion of the group. Based on this, the individual portion quantities of the previous adhesive portions are then adjusted to the size or quantity of this last desired portion.

This approach has various disadvantages. For example, unforeseen external interference effects can lead to incorrect predictions about the viscosity of the adhesive at the time of the last portion of the group, which in turn would lead to different portion quantities in the group and/or actual portion quantities deviating from target quantities. In addition, a cost-triggering temperature sensor is required, which has to be installed and wired into the valve at great expense. Furthermore, the process is sluggish due to the limited resolution and scanning speed of the sensor. Lastly, such a procedure cannot counteract the remagnetization effects described above.

BRIEF SUMMARY OF THE INVENTION

Based on this, it is the object of the present invention to further develop the aforementioned method and the aforementioned device.

This object is achieved by a method for applying individual portions of adhesive to a substrate, in which the portions of adhesive are applied successively to the substrate by means of a valve, a coil of an electromagnet being energized with an actuation voltage pulse for each successive dispensing of portions of adhesive from the valve, which causes a valve opening of the valve for an actual opening duration during which adhesive can flow out of the valve for dispensing the respective adhesive portion, in particular by moving a closure member of the valve from a closed position into an open position, wherein the actual opening duration of at least one of the valve openings which follows a valve opening which precedes it in time is shortened, preferably dynamically, in accordance with one or more valve operating parameters in order to compensate for, in particular, electromagnetic interference effects which extend the actual opening duration of the subsequent valve opening, said shortening being considered in comparison with an actual opening duration of the subsequent valve opening without such compensation, namely by applying an actuation voltage pulse to the coil, which causes the shortened actual opening duration.

This object also is achieved by a device for applying individual portions of adhesive to a substrate with a valve by which portions of adhesive are applied successively to the substrate, in particular a valve, which has a closure member movable from a closed position into an open position, and with an electromagnet comprising a coil, the coil being energizable with an actuation voltage pulse, generated by a control unit of the device, for each successive dispensing of portions of adhesive from the valve, which causes a valve opening of the valve for an actual opening duration during which adhesive can flow out of the valve for dispensing the respective adhesive portion, in particular by moving a closure member of the valve from a closed position into an open position, wherein the control unit is designed in such a way that the actual opening duration of at least one of the valve openings which follows a valve opening which precedes it in time is shortened, preferably dynamically, in accordance with one or more valve operating parameters in order to compensate for, in particular, electromagnetic interference effects which extend the actual opening duration of the subsequent valve opening, said shortening being considered in comparison with an actual opening duration of the subsequent valve opening without such compensation, namely by applying an actuation voltage pulse to the coil, which causes the shortened actual opening duration.

Accordingly, the method according to the invention is characterized in that the actual opening duration of at least one of the valve openings which follows a valve opening which precedes it in time is shortened, preferably dynamically, in accordance with one or more valve operating parameters in order to compensate for, in particular, electromagnetic interference effects which extend the actual opening duration of the subsequent valve opening, said shortening being considered in comparison with an actual opening duration of the subsequent valve opening without such compensation, namely by applying an actuation voltage pulse to the coil, which causes the shortened actual opening duration.

By reducing the actual opening time in this way in accordance with valve operating parameters describing the valve state, such as the average frequency of the valve openings and/or the time difference between two (directly) successive valve openings and/or the voltage applied to the coil and/or the current flowing in the coil, sensors for detecting the viscosity of the adhesive could be dispensed with and, in particular, remagnetization effects could be counteracted or compensated for. The strength of the aforementioned interference effects can be derived from one or more of these valve parameters and the actual opening time can then be reduced accordingly compared to the actual opening time without compensation. For example, the detected voltage induced in the coil can be used to evaluate or determine whether the valve, in particular the electromagnet, has a residual magnetization that would lead to an increase in the actual opening time without compensation and, if applicable, the strength of this magnetization. The actual opening time could then be selected accordingly in accordance with curves stored in the control system, for example, which show a correlation between residual magnetization and actual opening time.

Preferably, the, each or at least one of the valve operating parameters can be a currently determined valve operating parameter, which is determined during normal order operation of the valve, in particular continuously or at several discrete points in time by measurement and/or by calculation, the actual opening time being shortened to varying degrees, in particular dynamically, depending on the result of the determination.

Further preferably, the, each or at least one of the valve operating parameters can be a previously determined valve operating parameter, which is determined by measurement and/or calculation before the normal order operation of the valve and in particular stored in an electronic memory, in particular with assignment to another previously determined valve operating parameter, in particular the operating time. In normal order operation, this previously determined operating parameter and/or the assigned valve operating parameter can be used, preferably in such a way that the actual opening time is reduced during normal order operation of the valve in accordance with this previously determined valve operating parameter or in accordance with the assigned other operating parameter.

Further preferably, the actual opening duration of the subsequent valve opening can be shortened to the actual opening duration of the preceding valve opening, in particular to produce the same adhesive portion quantities in the adhesive portions of the preceding and subsequent valve openings.

Further preferably, the preceding valve opening can form the temporally first valve opening of a group of valve openings, which furthermore includes the subsequent valve opening and at least one further valve opening, also temporally subsequent to the preceding valve opening, the actual opening time of which is (also) shortened to compensate for the interference effects.

Further preferably, each actual opening duration of all subsequent valve openings of the group can be shortened to the actual opening duration of the preceding opening duration.

Further preferably, the reduction of the actual opening time of the subsequent valve opening can be carried out according to one or more of the following valve operating parameters: the average frequency of the valve openings, and/or the frequency between two successive valve openings, and/or the voltage applied to the coil and/or the current flowing in the coil, and/or the voltage or current which induces the actuation voltage pulse causing the valve to open at the previous time, and/or an armature part moving in the magnetic field of the coil, and/or the magnetic flux caused by the current flow through the coil, and/or the (magnetic) remanence of the magnetizable materials of the valve, in particular the electromagnet of the valve, and/or a measure of the self-heating of the valve, in particular the temperature of the valve and/or the adhesive.

It is also preferable to apply the actuation voltage pulses to the coil for the valve openings at a fixed, non-varying frequency.

Further preferably, in order to effect the or the respective shorter actual opening duration of the or each subsequent valve opening, the voltage of the actuation voltage pulse effecting this can be or is provided with a duty cycle of less than 100%, whereas the actuation voltage pulse effecting the actual opening duration of the preceding valve opening is provided with no duty cycle or a duty cycle of 100%.

Further preferably, the actuation voltage pulses for all valve openings with which the coil is energized can each be based on the same, preferably rectangular, voltage curve, in particular each with a duty cycle between 0% and 100%.

Further preferably, different duty cycles can be stored in an electronic memory for different values of one or more of the valve operating parameters or a parameter dependent on the respective valve operating parameter. A value of the respective valve operating parameter or the parameter dependent on it can be determined by measurement and/or calculation in normal order operation or in a measuring mode of the valve. According to the result of the determination, the appropriate duty cycle can then be selected from the memory and the, or each, actuation voltage pulse that causes the, or a, respective subsequent valve opening can be provided with the selected duty cycle.

Further preferably, the duty cycle for the or each subsequent actuation voltage pulse can be selected in accordance with the, each or one of the valve operating parameters, in particular in accordance with the voltage induced in the coil by the actuation voltage pulse which immediately precedes the actuation voltage pulse causing the subsequent valve opening and/or in accordance with the voltage induced in the coil by an armature part moving in the magnetic field of the coil, in particular the closing member of the valve.

Furthermore preferably, within the scope of shortening the actual opening time of the subsequent valve opening, in particular by using a corresponding actuation voltage pulse, in addition to the interference effects that would extend the actual opening time of the respective valve opening without compensation, changes in the viscosity of the adhesive based in particular on the self-heating of the valve can also be compensated for, which, without compensation, would lead to larger portion quantities of the dispensed adhesive portions if the actual opening time of successive valve openings were assumed to be the same due to the decreasing adhesive viscosity.

Further preferably, the duty cycles stored in particular in the memory can take into account a factor, in particular a fixed factor, previously determined outside the normal order operation of the valve, which is used to compensate for the viscosity changes of the adhesive during normal order operation.

Further preferably, in order to effect the shorter actual opening duration of the respective subsequent valve opening, a fixed voltage specification stored in an electronic memory, which is lower than the actuation voltage pulse of the preceding valve opening, can be selected for the actuation voltage pulse effecting this.

Further preferably, different voltage specifications for the actuation voltage pulse causing the, or the respective, subsequent valve opening can be stored in the electronic memory, in particular in a table or in a formula, with one of the stored voltage specifications being selected for this actuation voltage pulse, in particular in accordance with the, each or one of the valve operating parameters measured during or before the normal order operation of the valve.

It is also preferable to apply selectively a voltage that reduces or counteracts magnetic remanence, in particular an alternating voltage, to the coil during normal order operation of the valve, in particular before each actuation voltage pulse.

Further preferably, in the context of a measuring operation carried out outside the normal order operation of the valve, in particular during flushing cycles in which the valve is cleaned by flushing, the, each or one of the valve operating parameters and/or one or more invariable valve characteristic values, such as the resistance of the coil or its inductance, can be determined by measurement and/or by calculation, in particular to determine the self-heating of the valve and/or the wear of the valve.

Further preferably, the wear of the valve can be determined and/or monitored using the or each valve operating parameter and/or the valve characteristic value(s) determined during the measuring operation.

Further features of the present invention can be found in the accompanying claims, the following description of preferred exemplary embodiments, and in the accompanying drawings.

DETAILED DESCRIPTION OF PREFERRED EMBODIMENTS

Figure 2:
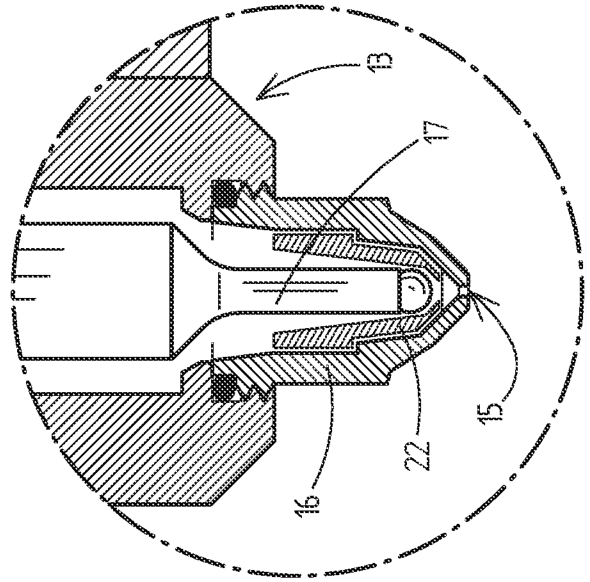
FIG. 2 shows an enlarged view of detail II from FIG. 1.

The shown (application) device 10 for applying individual portions of adhesive comprises a valve arrangement 11 with an (adhesive) distributor 12, to which one or more individual valves 13 are attached. Each valve or individual valve 13 is connected in a manner known per se to an adhesive supply channel 14 of the distributor 12, via which adhesive is supplied to the respective valve 13 from an adhesive source, not shown, for example by means of a feed pump, which is also not shown.

The valve 13 dispenses the adhesive supplied to it intermittently, i.e., in individual portions one after the other, for example onto a substrate, not shown, such as a blank for a cigarette pack. This can take the form of a series of successive, spaced-apart, in particular but not necessarily dot-shaped adhesive portions. Each portion of adhesive is dispensed from a nozzle opening 15 of a nozzle 16 of the valve 13. For this purpose, the movable closure member 17 is moved upwards from the closed position of the valve 13 shown in FIG. 1 into an open position.

The nozzle 16 can be made of metal, for example, in order to ensure good thermal conductivity between the nozzle 16 and the adhesive. This is because it is regularly a fundamental objective to maintain the adhesive temperature within the valve 13 at as uniform a level as possible during normal or standard operation of the valve 13 or the device 10, during which the portions of adhesive are applied to the substrate as part of a production process, in order to keep the viscosity of the adhesive as uniform as possible throughout the valve 13. This can be achieved particularly well by transferring heat as evenly as possible by means of a suitable design of the valve 13 and by selecting suitable materials within the valve 13.

An inlay 22 made of high-strength material is arranged on the inside of the nozzle 16 in order to ensure the highest possible wear resistance under cyclic loading by the closing element 17; cf. FIG. 2.

Ampcoloy or another ceramic material or material mixture can be used as a high-strength material, for example. The inlay 22 is preferably glued into the nozzle 16, but can also be connected to it in another form-fit or force-fit manner. The inlay 22 thus forms a wear-resistant valve seat for the closure member 17 within the nozzle 16.

The valve 13 shown is electromagnetically actuated in that an electromagnet comprising a coil 18 is switched accordingly by a control unit of the device 10, which control unit is not shown. For this purpose, power lines 19 are routed through the distributor 12 from the control unit to the valve 13.

Figure 1:
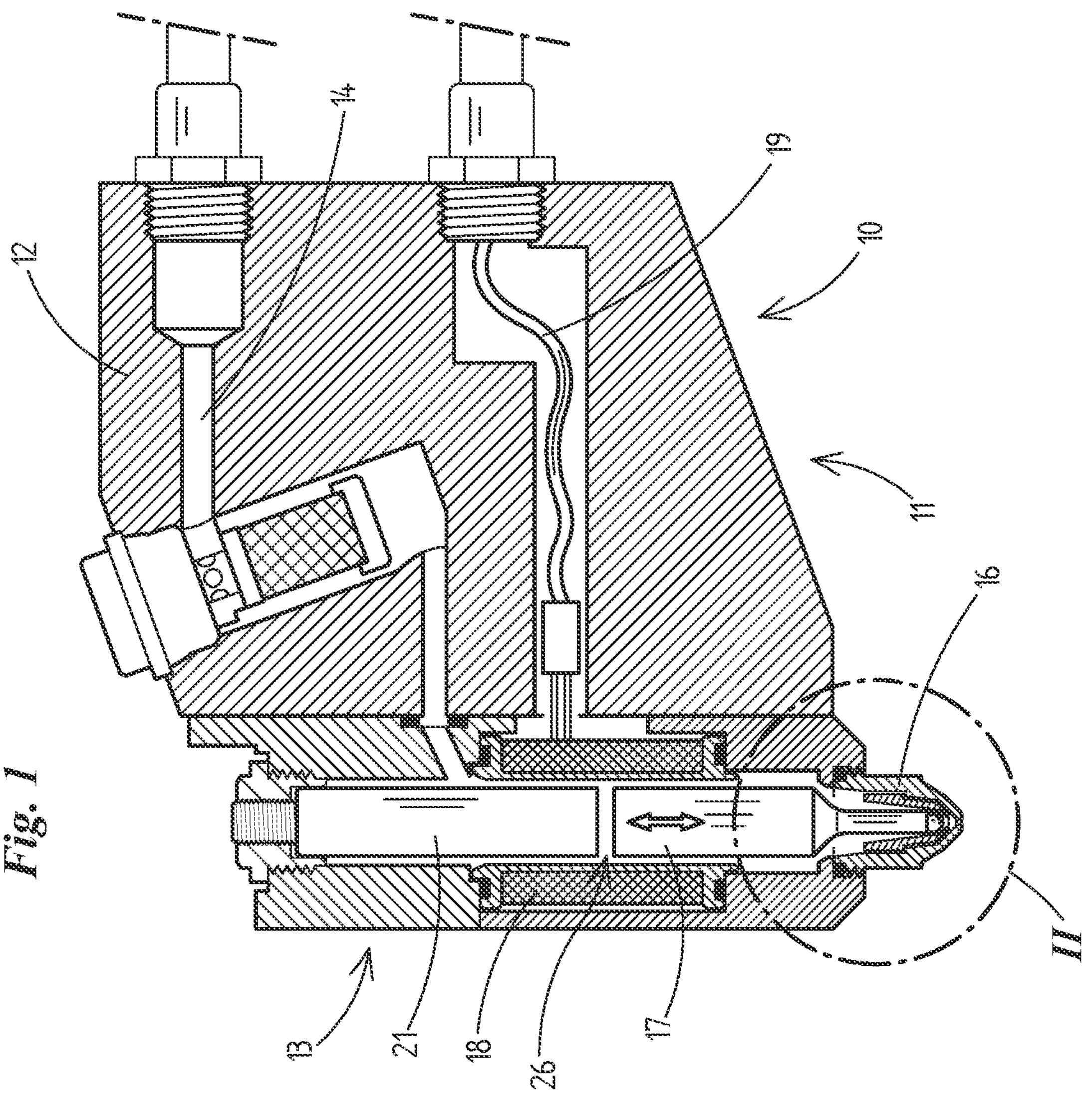
FIG. 1 shows a cross-section through a device according to the invention, shown in its essential parts, for applying portions of adhesive to substrates, which device can be operated using the method according to the invention.

Specifically, in the present case, the coil 18 of the electromagnet is in each case subjected to actuation voltage pulses 20 spaced apart in time, which trigger a magnetic force by which the locking member 17, which is at least partially made of metal and acts as an armature, is moved (upwards) into the open position against a restoring force of a restoring member 26, which holds the locking member in the closed position shown in FIG. 1.

To generate the restoring force in the present case, the restoring member 26 comprises one or more pairs of permanent magnets of the same name which repel each other and which are arranged at opposite ends of the closure member 17 and a stop part 21. Of course, the restoring member 26 could also comprise a return spring or the like.

Overall, it is understood that various other types of electromagnetic valves or valves that are switched with the aid of electromagnets can also be used for the application device 10 according to the invention or the application method according to the invention described in greater detail below. For example, so-called snuff-back valves can also be used, in which the closing element 17 is moved downwards from a closed position in order to transfer this into an open position. It is also conceivable to use pneumatically actuated valves in which the compressed air supply is switched or controlled electromagnetically.

Figure 3:
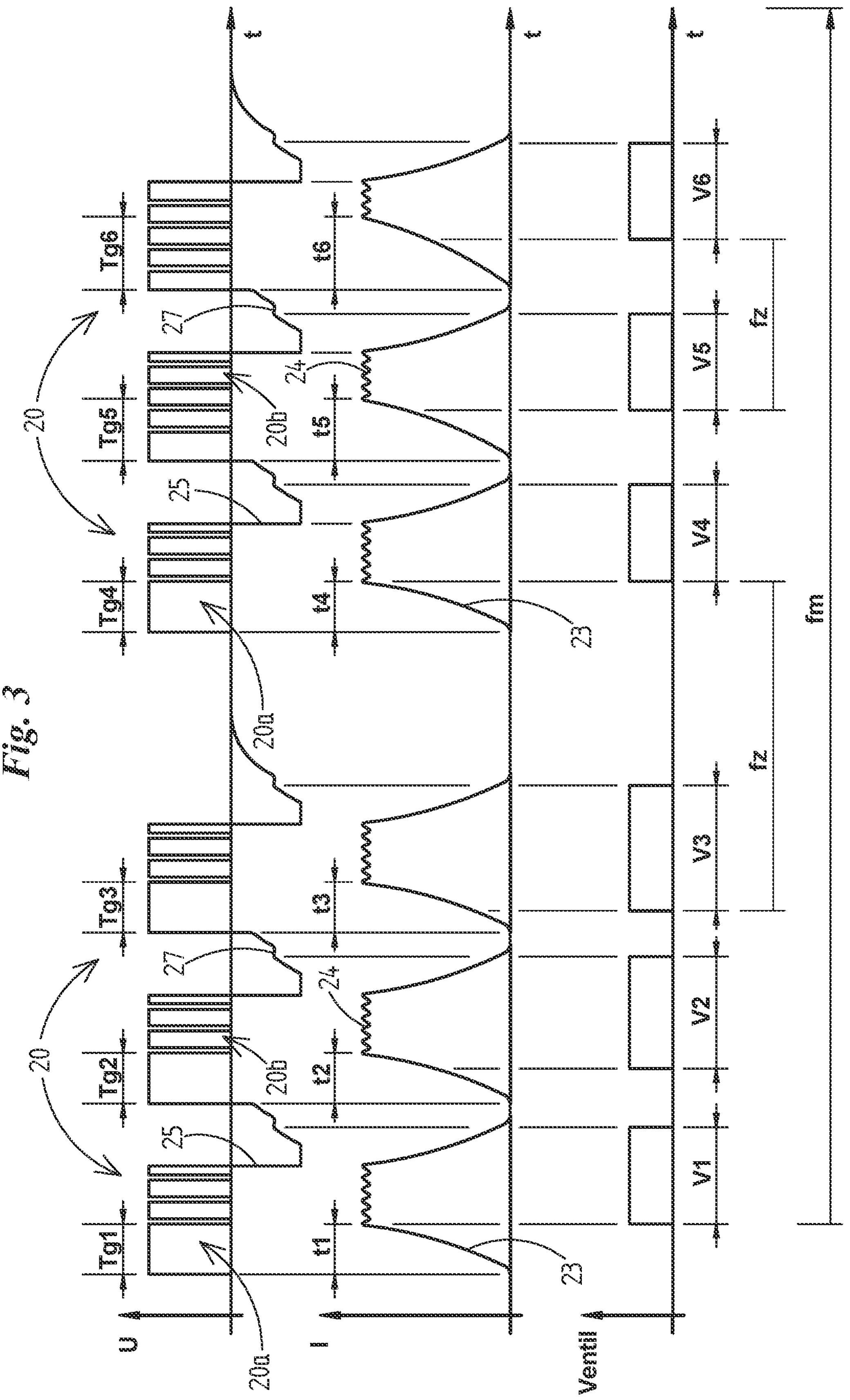
FIG. 3 shows three graphs that qualitatively show the relationships between actuation voltage pulses, the resulting current flows in the coil of the solenoid and the opening times and frequencies of the resulting valve openings.

FIG. 3 shows three exemplary graphs arranged one below the other, which are used to explain the method according to the invention in greater detail.

The upper graph shows the time curve of the voltage occurring at the coil 18 of the valve 13. This is made up of actuation voltage pulses 20, which are applied to the coil 18 by the control unit of the device 10 during operation of the valve 13, and voltages induced in the coil 18 by electromagnetic effects.

The graph in the middle shows the time curve of the electrical current in the coil 18 due to the voltage, in particular due to the actuation voltage pulses 20.

Lastly, the lower graph shows the actual opening durations V1, V2 . . . V6 of the valve 13.

The left half of FIG. 3 shows the curves or data that result without the compensation of interference effects according to the invention (prior art). The right half of FIG. 3, on the other hand, shows the curve progressions/data with compensation of the interference effects.

As can be seen in the left-hand half of FIG. 3, three actuation voltage pulses 20 are applied to the coil 18 one after the other, in this case with an identical time interval between them.

Each actuation voltage pulse 20 has a (in the present case rectangular) component 20 *a*, which causes an opening current 23 (rising edge in the current curve) in the coil 18 for a duration t1 . . . t3 and which triggers a magnetic force that leads to the respective opening movement of the shutter member 17 in a manner known per se.

Each actuation voltage pulse 20 also has an identical component 20 *b* following the component 20 *a*, which causes a holding current 24 (horizontal current section) as soon as the closure member 17 is struck against the stop part 21 at the end of its opening movement. For this purpose, the respective component 20 *b* of the respective actuation voltage pulse 20 has a lower average voltage value than the respective components 20 *a* (in the present case, by providing the voltage with a corresponding duty cycle of less than 100%).

In order to close the valve, the respective actuation voltage pulse 20 then ends or the voltage thereof is set to 0, so that the restoring force of the restoring element of the valve 13 outweighs the (magnetic) holding force generated by the holding current and the closing element 17 is returned to the closed position of the valve 13.

This return movement of the closing element 17 triggers an induction voltage 25 in the coil 18.

The contact of the closing element 17 with the valve seat at the end of the return movement (compare the closed position in FIG. 1), is visible as a discrete voltage pulse 27.

The respective actual opening times (V1, V2, V3) of the valve 13, i.e., the effective time during which the valve 13 is open and adhesive can escape from it, the closing element 17, i.e., the nozzle opening 15 is released, results from the time between the lifting of the closing element 17 and the corresponding release of the nozzle opening 15 after the current is applied by the coil 18 and the subsequent impact of the closing element 17 on the valve seat with renewed closing of the nozzle opening 15.

As can also be clearly seen in the left half of FIG. 3, this actual opening time of the valve 13 increases from actuation voltage pulse 20 to actuation voltage pulse 20 or as operation of the adhesive valve 13 progresses (V1<V2<V3).

As a result, the portions of adhesive dispensed by the valve 13 become correspondingly larger. This is generally not desirable, especially if adhesive portions of the same quantity are to be applied, as is often required depending on the application.

The reason for the lengthening actual opening time is, among other things, interference effects caused by remanences or remagnetizations forming in the valve 13, in particular in the electromagnet of the valve 13. These remanences result in an additional magnetic force caused by the remagnetizations being added to the magnetic force triggered by the coil current.

However, changes in the viscosity of the adhesive due to the operation-related, progressive heating of the valve 13 (self-heating) also lead to interference effects that extend the actual opening times. This is because the closing element 17 requires less time to be moved through the adhesive (the resistance of the adhesive decreases) due to the lower viscosity as the adhesive heats up.

While, for example, in the case of the first actuation voltage pulse 20, the valve 13 only actually opens, as intended, after a time t1 at the end of the current rise after the start of the actuation voltage pulse 20, or the closing element 17 lifts off the valve seat, which in turn corresponds to the end of the opening current section 23 or the end of the rising edge of the current curve, the valve 13 opens at an earlier point in time in the case of the subsequent second actuation voltage pulse 20, even before the end of the opening current t2, and at an even earlier point in time with the subsequent, further or third actuation voltage pulse 20. This is because, as already mentioned, only a lower current is required for the closure member 17 to lift off the valve seat with the subsequent actuation voltage pulses 20, and the corresponding threshold value at which the closure member 17 lifts off decreases.

According to the invention, provision is now made to compensate for the aforementioned interference effects by shortening the actual opening durations of the valve openings caused by subsequent actuation voltage pulses 20 of a group of actuation voltage pulses 20, in particular to the length of that actual opening duration which is caused by a preceding actuation voltage pulse 20, for example by the temporally first actuation voltage pulse 20 of the group.

For this purpose, an actuation voltage pulse 20 is applied to the coil 18 and results in an actual opening duration corresponding to that of the actual opening duration caused by a preceding, in particular the first actuation voltage pulse 20.

The corresponding correlations are shown in the right half of FIG. 3.

As can be seen there, the average voltage of the previously identical (compare left half of FIG. 3) components 20 *a* of the fifth and sixth actuation voltage pulse 20 is reduced by applying the (output) voltage with corresponding duty cycles Tg5 and Tg6, which are selected to be less than 100% (the duty cycles Tg1-Tg3 in the left half of FIG. 3 and Tg4 in the right half of FIG. 3 are each identical and amount to 100%, which corresponds to an unchanged output voltage signal).

This slows down the current increase of the respective opening current 23 (rising edge) triggered by the subsequent fifth and sixth actuation voltage pulses 20 compared to the current increase of the opening current 23 triggered by the preceding, fourth actuation voltage pulse 20, which results in a later lifting of the closure member 17 from the valve seat or a later opening of the valve 13 than without such compensation.

As can be seen, the actual opening times and thus the respective dispensed adhesive portions can be brought to identical values or quantities in this way despite the interference effects.

Alternatively, instead of using duty cycles with which identical actuation voltage pulses are previously applied to slow down the rise in current, it is of course also conceivable to store suitable voltage specifications or voltage curves with different mean values (decreasing on average) in a memory, for or as actuation voltage pulses, which are then selected by the control system.

According to the invention, the aforementioned shortening of the subsequent valve openings is carried out in each case in accordance with one or more valve operating parameters of the valve 13.

These valve operating parameters can preferably be current valve operating parameters, which are determined during normal operation of the device 10 or the valve 13 by measurement and/or by calculation.

In the present case, such a valve operating parameter can be, for example, the voltage applied to the coil 18, which is measured accordingly and which is composed of the voltage of the predetermined actuation voltage pulses 20 and, if applicable, of the voltage induced by the actuation voltage pulses 20 or the return movement of the shutter member 17.

The current in the coil 18 can also be used as a valve operating parameter.

The same applies to the time intervals between two valve openings or the (changing) frequency fz of the valve openings or the average frequency fm over several valve openings.

It is also conceivable here to determine further valve operating parameters by calculation on the basis of the currently measured valve parameters, such as the voltage occurring at the coil 18, the current flowing through it and/or the voltage induced in it or the current induced in it, and then to control the actual opening times or select the actuation voltage pulses for the respective valve openings in accordance with the valve operating parameters determined by calculation.

From the valve operating parameters determined by measurement, the controller of the device 10 could then, for example, derive or calculate the current remanence of the coil 18 as a valve operating parameter. If the coil resistance and the resistance of the current lines to which the coil 18 is connected are then also known, the current heating of the valve 13 and/or the adhesive can also be derived or a measure thereof, in particular the temperature.

Depending on the determined current remanence and/or self-heating of the valve, the actual opening duration can then be set precisely as described or desired by selecting the appropriate duty cycle of the next actuation voltage pulse 20.

If the determination shows that there is no remanence and no heating, for example when starting up the device 10 or the valve 13 after a standstill phase, an actuation voltage pulse 20 could then initially be used without application of a duty cycle or with application of a duty cycle of 100%; cf. for example Tg4 in FIG. 3.

If, on the other hand, the determination results in a remanence and/or heating of the valve 13, the actuation voltage pulse 20 following the determination would then be dynamically adapted by selecting the appropriate duty cycle so that the desired actual opening duration is set in each case; cf. Tg5 and Tg6.

Which duty cycle at which remanence or heating value is then actually used by the control unit in normal operation can, for example, have been determined and specified empirically beforehand and stored either by formula or in tabular form in a memory assigned to the control unit, so that the control unit then calculates the suitable duty cycle in accordance with the currently determined remanence or heating value or selects it from the table.

Alternatively or additionally, it is of course also conceivable, as already indicated above, to dispense with the mathematical determination of such valve operating parameters derived from the measured valve operating parameters in whole or in part and to control the actual opening durations also or additionally in accordance with the measured valve operating parameters or to select the actuation voltage pulses 20 accordingly.

Alternatively or additionally, it would also be conceivable to determine certain valve operating parameters in advance (by measurement and/or calculation) outside of normal (order) operation, for example in a measuring mode (such as during cleaning phases that are running anyway or during a rinsing operation), and to store them in an electronic memory assigned to the control unit.

If possible, operating time dependencies of the valve parameters could also be determined and linked in the memory with the respective valve operating parameter in the form of a table or in a formula. In subsequent normal operation, the control unit could then, for example, determine the assigned valve parameter from the table according to the current operating time, which is then determined or measured, and then determine the respective duty cycle for the respective subsequent actuation voltage pulse 20 according to this, for example with recourse to a table or a formula in which an assignment between valve operating parameter and duty cycle is stored.

Alternatively, it is of course also conceivable to directly derive or determine a correlation or assignment between valve operating time and duty cycle and to store this in a formula and a table, so that the selection criterion for the correct duty cycle would then, in other words, in the simplest case only be the current operating time.

In such a measurement mode carried out outside the normal operation of the valve, in particular during a flushing operation, one or more invariable valve parameters, such as the resistance of the coil 18 or its inductance, could also be determined by measurement and/or calculation.

In addition to the particularly dynamic reduction of the actual opening time according to the invention, it is also conceivable to establish a monitoring system based on one or more measured valve parameters in order to detect the wear of the valve 13. This can be done in particular on the basis of or by evaluating the voltage pulse 27, which is generated by the impact of the closure member 17 on the valve seat and which is subject to characteristic changes during wear.

In order to counteract the electromagnetic interference effects, it is also conceivable, alternatively or additionally, to apply a voltage that reduces or counteracts magnetic remanence, in particular an alternating voltage, to the coil 18 during normal operation of the valve 13, in particular before each actuation voltage pulse 20.

LIST OF REFERENCE SIGNS

10 application device
11 valve arrangement

12 distributor
13 valve
14 adhesive supply channel
15 nozzle opening
16 nozzle
17 closure member
18 coil
19 power lines
20 actuation voltage pulses
20 *a* component actuation voltage pulse
20 *b* component actuation voltage pulse
21 stop part
22 inlay
23 opening current
24 holding current
25 induction voltage
26 restoring member
27 voltage pulse (contact)

What is claimed is:

1. A method for applying individual portions of adhesive to a substrate, in which the portions of adhesive are applied successively to the substrate by means of a valve (13), a coil (18) of an electromagnet being energized with an actuation voltage pulse (20) for each successive dispensing of portions of adhesive from the valve (13), which causes a valve opening of the valve (13) for an effective opening duration, namely an opening duration during which a respective adhesive portion can effectively flow out of the valve (13) for dispensing the respective adhesive portion, wherein the effective opening duration of at least one of the valve openings which follows a valve opening which precedes it in time is shortened in comparison with a hypothetical effective opening duration of the subsequent valve opening without such shortened duration, said shortened duration being done in accordance with one or more valve operating parameters in order to compensate for effects which extend the effective opening duration of the subsequent valve opening, and being done by applying an actuation voltage pulse (20) to the coil (18), which causes the shortened effective opening duration.

2. The method as claimed in claim 1, wherein the, each or at least one of the valve operating parameters is a currently determined valve operating parameter, which is determined during normal order operation of the valve (13) by measurement and/or by calculation, and wherein the effective opening duration is shortened to varying degrees depending on the result of the determination.

3. The method as claimed in claim 2, wherein the, each or at least one of the valve operating parameters is a previously determined valve operating parameter, which is determined by measurement and/or calculation before the normal order operation of the valve (13) and wherein, in normal order operation, this previously determined operating parameter is used in such a way that the effective opening duration is reduced during normal order operation of the valve (13) in accordance with this previously determined valve operating parameter or in accordance with the assigned other operating parameter.

4. The method as claimed in claim 1, wherein the effective opening duration of the subsequent valve opening is shortened to the effective opening duration of the preceding valve opening.

5. The method as claimed in claim 1, wherein the preceding valve opening forms the temporally first valve opening of a group of valve openings, which furthermore includes the subsequent valve opening and at least one further valve opening, also temporally subsequent to the preceding valve opening, the effective opening duration of which is also shortened to compensate for the interference effects.

6. The method as claimed in claim 5, wherein each effective opening duration of all subsequent valve openings of the group is shortened to the effective opening duration of the preceding opening duration.

7. The method as claimed in claim 1, wherein the reduction of the effective opening duration of the subsequent valve opening is carried out according to one or more of the following valve operating parameters: the average frequency of the valve openings, and/or the frequency between two successive valve openings, and/or the voltage applied to the coil (18) and/or the current flowing in the coil (18), and/or the voltage or current which induces the actuation voltage pulse (20) causing the valve to open at the previous time, and/or an armature part moving in the magnetic field of the coil (18) induced in the coil (18), and/or the magnetic flux caused by the current flow through the coil (18), and/or the (magnetic) remanence of the magnetizable materials of the valve (13).

8. The method as claimed in claim 1, wherein the actuation voltage pulses (20) are applied to the coil (18) for the valve openings at a fixed, non-varying frequency.

9. The method as claimed in claim 1, wherein in order to effect the or the respective shorter effective opening duration of the or each subsequent valve opening, the voltage of the actuation voltage pulse effecting this is provided with a duty cycle of less than 100%, whereas the actuation voltage pulse (20) effecting the effective opening duration of the preceding valve opening is provided with no duty cycle or a duty cycle of 100%.

10. The method as claimed in claim 9, wherein the duty cycle for the or each subsequent actuation voltage pulse (20) is selected in accordance with the, each or one of the valve operating parameters, namely the voltage induced in the coil (18) by the actuation voltage pulse (20) which immediately precedes the actuation voltage pulse (20) causing the subsequent valve opening and/or in accordance with the voltage induced in the coil (18) by an armature part moving in the magnetic field of the coil (18).

11. The method as claimed in claim 9, wherein the duty cycles take into account a factor previously determined outside the normal order operation of the valve (13), which is used to compensate for the viscosity changes of the adhesive during normal order operation.

12. The method as claimed in claim 1, wherein the actuation voltage pulses (20) for all valve openings with which the coil (18) is energized are based on the same.

13. The method as claimed in claim 1, wherein different duty cycles are stored in an electronic memory for different values of one or more of the valve operating parameters or a parameter dependent on the respective valve operating parameter, wherein a value of the respective valve operating parameter or the parameter dependent on it is determined by measurement and/or calculation in normal order operation or in a measuring mode of the valve (13), wherein, according to the result of the determination, the appropriate duty cycle is selected from the memory, and wherein the, or each, actuation voltage pulse (20) that causes the, or a, respective subsequent valve opening is provided with the selected duty cycle.

14. The method as claimed in claim 1, wherein within the scope of shortening the effective opening duration of the subsequent valve opening in addition to the interference effects that would extend the effective opening duration of the respective valve opening without compensation, changes in the viscosity of the adhesive are compensated for, which, without compensation, would lead to larger portion quantities of the dispensed adhesive portions if the effective opening duration of successive valve openings were assumed to be the same due to the decreasing adhesive viscosity.

15. The method as claimed in claim 1, wherein in order to effect the shorter effective opening duration of the respective subsequent valve opening, a fixed voltage specification stored in an electronic memory, which is lower than the actuation voltage pulse (20) of the preceding valve opening, is selected for the actuation voltage pulse (20) effecting this.

16. The method as claimed in claim 15, wherein different voltage specifications for the actuation voltage pulse (20) causing the, or the respective, subsequent valve opening are stored in an electronic memory, and wherein one of the stored voltage specifications is selected for this actuation voltage pulse (20) in accordance with the, each or one of the valve operating parameters measured during or before the normal order operation of the valve (13).

17. The method as claimed in claim 1, wherein a voltage that reduces or counteracts magnetic remanence is applied selectively to the coil (18) during normal order operation of the valve (13).

18. The method as claimed in claim 1, wherein in the context of a measuring operation carried out outside the normal order operation of the valve (13) the, each or one of the valve operating parameters and/or one or more invariable valve characteristic values, such as the resistance of the coil (18) or its inductance, are determined by measurement and/or by calculation.

19. The method as claimed in claim 18, wherein the wear of the valve (13) is determined and/or monitored using the or each valve operating parameter and/or the valve characteristic value(s) determined during the measuring operation.

* * * * *